(12) United States Patent
Larisch

(10) Patent No.: US 6,314,168 B1
(45) Date of Patent: Nov. 6, 2001

(54) METHOD FOR OUTPUT HANDLING OF MESSAGES STORED IN MAILBOXES OF A MESSAGE STORAGE SYSTEM OF A TELECOMMUNICATIONS SYSTEM

(75) Inventor: Erhard Larisch, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/441,534

(22) Filed: Nov. 16, 1999

Related U.S. Application Data

(63) Continuation of application No. PCT/DE98/01126, filed on Apr. 22, 1998.

(30) Foreign Application Priority Data

May 16, 1997 (DE) .............................................. 197 20 597

(51) Int. Cl.⁷ ...................................................... H04M 1/64
(52) U.S. Cl. .................................... 379/88.22; 379/88.13; 379/88.19
(58) Field of Search ................................ 379/67.1, 88.13, 379/88.18, 88.19, 88.2, 88.22, 88.29, 201.01, 207.01, 210.01

(56) References Cited

U.S. PATENT DOCUMENTS

| | | | |
|---|---|---|---|
| 5,199,062 | * 3/1993 | Von Meister et al. ................. | 379/67 |
| 5,857,013 | * 1/1999 | Yue et al. ............................... | 379/67 |
| 5,937,047 | * 8/1999 | Stabler ................................... | 379/201 |
| 5,995,826 | * 11/1999 | Cox et al. ......................... | 379/67.1 X |
| 6,104,786 | * 8/2000 | Gibilisco et al. .................. | 379/88.23 |
| 6,169,795 | * 1/2001 | Dunn et al. ........................... | 379/209 |

FOREIGN PATENT DOCUMENTS

| | | |
|---|---|---|
| 0255325A2 | 2/1988 | (EP) . |
| 0455912A2 | 11/1991 | (EP) . |
| 0588101A2 | 3/1994 | (EP) . |
| 0685957A2 | 12/1995 | (EP) . |
| 2290920A | 1/1996 | (GB) . |
| 8293920A | 11/1996 | (JP) . |

OTHER PUBLICATIONS

Siemens Hicom 300 Voice Mail Services VMS, 1995, Order No. A31002–S10–A1–7–5.

* cited by examiner

Primary Examiner—Scott L. Weaver
(74) Attorney, Agent, or Firm—Herbert L. Lerner; Laurence A. Greenberg

(57) ABSTRACT

For outputting stored messages, not only is a first connection between a terminal device of a mailbox holder and a message storage system SSS but also a second connection between the telecommunications system associated with the terminal device of the mailbox holder and the message storage system SSS are made. If the mailbox holder instigates the making of a connection to a terminal device of a subscriber who has left a message, then this connection takes the place of the first connection. When this latter connection is then terminated by the subscriber, a first connection between the terminal device of the mailbox holder and the message storage system is then re-made, with the aid of signaling information stored in memory in the course of the making of the second connection.

7 Claims, 2 Drawing Sheets

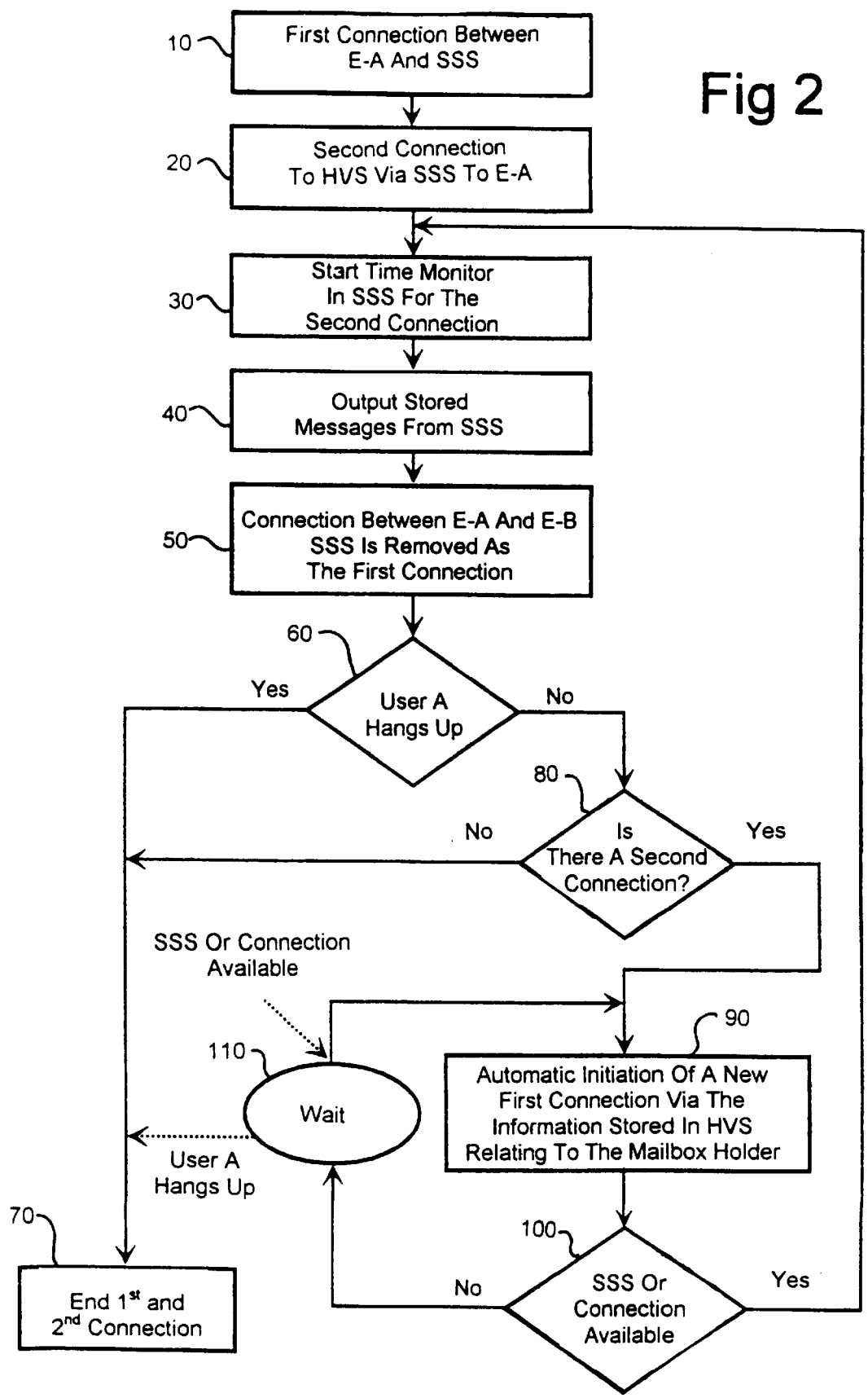

METHOD FOR OUTPUT HANDLING OF MESSAGES STORED IN MAILBOXES OF A MESSAGE STORAGE SYSTEM OF A TELECOMMUNICATIONS SYSTEM

CROSS-REFERENCE TO RELATED APPLICATION

This application is a continuation of copending International Application PCT/DE98/01126, filed Apr. 22, 1998, which designated the United States.

BACKGROUND OF THE INVENTION

Field of the Invention

From the Siemens AG product brochure entitled "HICOM 300 'Voice Mail Service VMS'", 1995, Order No. A31002-S10-A1-7-5, a speech storage system or voice mail service (VMS) is known that is integrated into a private integrated services digital network (ISDN) switching system. The voice mail service serves to store, call up, and distribute messages in natural speech form. The users enrolled in the voice mail service are assigned a personal mailbox ("voice mailbox"). Mailbox holders can divert calls intended for them to their mailbox in their absence, and the messages forwarded with the calls are then stored in the mailbox.

By dialing his mailbox, the enrolled user can listen to the stored messages any time, anywhere. An acoustic user guide facilities the use of the voice mail service. For example, using the voice mail service is done with the aid of frequency tones, which can be activated via the keypad of a terminal device, by the multi-frequency selection method (MFSM).

Once a stored message has been listened to, it can be erased, stored, or processed. For instance, a question from a party who has left a spoken message can be answered directly in the mailbox of the inquiring party. Once a message has been listened to, a telephone connection with that party can also be made, without having to enter his telephone number (callback).

From Published, British Patent Application GB 2 290 920 A, for instance, a voice mail service in a telecommunications system is known in which by way of a conference connection, a connection can be made between a terminal device of a mailbox holder, a terminal device of a calling party, and the mailbox of the mailbox holder. Without the knowledge of the calling party, the mailbox holder can listen in while the message sent by that party is being recorded in the mailbox. At the instigation of the mailbox holder, the recording can be stopped, and the connection between the terminal device of the calling party and the mailbox can be broken and replaced by a direct connection between the terminal device of the mailbox holder and the terminal device of the calling party.

From Published, European Patent Application EP 0 685 957 A, a method for storing voice messages in a telecommunications system is also known. Here, in cases where no connection route to a voice mail service is available when a calling party calls, and the calling party activates an automatic redial, the telephone numbers of the voice mail service and of the called party are stored in memory in the telecommunications system. When a connection route becomes available, the telephone number of the called party is carried on to the voice mail service, which thereupon connects the calling party to the mailbox of the called party.

With the increasing use of voice mail services ("voice mail"), the number of messages to be stored briefly (for instance during a meeting) or for longer periods (such as when the called party is away for several days) increases as well. It is thus important that the mailbox holder be able to run through all the stored voice messages quickly and as simply as possible.

In an unsuccessful callback, that is, when a connection has not been made between the mailbox holder and a subscriber who has left a voice message, many voice mail services allow leaving a spoken message and/or then continuing with the processing, without interruption, of the next or another spoken message along the lines of a logical "voice mail user session". Conversely, if an attempt to connect to a subscriber who has left a spoken message is successful, that is, has led to a desired two-person connection between the mailbox and the subscriber, without further participation by the voice mail service, then the connection with the voice mail service always ends when the two-person connection is terminated.

After a successful connection between the mailbox holder and the subscriber who has left a spoken message, the mailbox holder, to continue running through his messages, has to make a new connection with the voice mail service in order to continue his voice mail session with the next or some other stored message, or to continue erasing the message he has just successfully handled. Therefore, in the course of making the new connection, all the necessary identification data, and passwords if necessary, have to be input all over again.

SUMMARY OF THE INVENTION

It is accordingly an object of the invention to provide a method for output handling of messages stored in mailboxes of a message storage system of a telecommunications system which overcomes the above-mentioned disadvantages of the prior art methods of this general type, which makes a voice mail user session more convenient.

With the foregoing and other objects in view there is provided, in accordance with the invention, a method for output handling of messages stored in mailboxes of a message storage system of a telecommunications system, which includes:

setting up a first connection between a terminal device of a mailbox holder and the message storage system;

setting up a second connection between the telecommunications system associated with the terminal device of the mailbox holder and the message storage system, a telephone number of the terminal device of the mailbox holder and a telephone number of the message storage system being stored in a memory of the telecommunications system;

setting up a third connection between the terminal device of the mailbox holder and a terminal device of a subscriber if a message has been left for the mailbox holder by the subscriber where the third connection replaces the first connection; and setting up a new first connection between the terminal device of the mailbox holder and the message storage system using the telephone number of the terminal device of the mailbox holder and the telephone number of the message storage system stored in the telecommunications system upon a termination, instigated by the subscriber, of the third connection between the terminal device of the mailbox holder and the terminal device of the subscriber.

One substantial advantage of the method of the invention is that after a successful callback connection has been terminated, the mailbox holder, in order to continue the voice mail user session, does not have to re-dial anything or to re-identify himself using the required security codes (code number, password).

A time monitor can serve to limit the length of a voice mail user session, thus preventing blockage of the entire voice mail service by only a small number of mailbox holders.

If continuance reports ("Voice_Mail_User_Session_Alive") are sent from the telecommunications system to the voice mail service, the risk that the time monitor is about to elapse can be counteracted in special cases, so that even after relatively long conversations, a voice mail user session can be continued without interruption.

Other features which are considered as characteristic for the invention are set forth in the appended claims.

Although the invention is illustrated and described herein as embodied in a method for output handling of messages stored in mailboxes of a message storage system of a telecommunications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a flow chart of a method for conducting the voice mail user session according to the invention.

DESCRIPTION OF THE PREFERRED EMBODIMENTS

Figure 1:
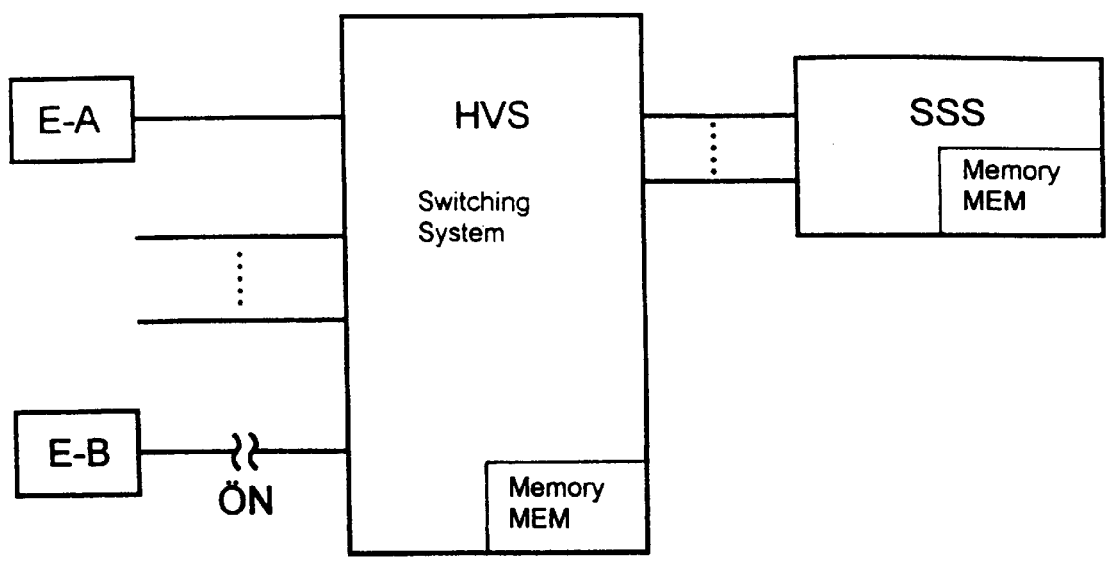
FIG. 1 is a diagrammatic, block diagram of function units that take part in a voice mail user session.

In all the figures of the drawing, sub-features and integral parts that correspond to one another bear the same reference symbol in each case. Referring now to the figures of the drawing in detail and first, particularly, to FIG. 1 thereof, there is shown a switching system (i.e. a telecommunications system) HVS with a terminal device E-A, which is assigned to a mailbox holder. A voice mail service SSS and a terminal device E-B of a subscriber, who has left a spoken message in the mailbox, are also shown. The terminal devices E-A of the mailbox holder and E-B of the subscriber need not be connected directly to the switching system HVS; they can also be connected to the switching system HVS via a public network ÖN. Both the voice mail service SSS and the switching system HVS each have a memory MEM for storing information.

For example, the voice mail service SSS is connected to the switching system HVS by an ISDN connection or an analog connection.

FIG. 2 shows a flow chart that includes the essential steps in going through messages stored in the voice mail service SSS. In this process, starting at step 10 a first connection is made between the terminal device E-A of the mailbox holder and the voice mail service SSS. In addition to the first connection, a logical second connection is then made in step 20 (for instance, signaling an ISDN connection via the D-channel). As a rule, the second connection stays in existence longer than the first connection. The initiative for making the logical second connection comes from the voice mail service SSS on the basis of defined user actions, such as a choice of a certain port (connection channel between the voice mail service SSS and the switching system HVS) of the voice mail service SSS.

In the context of making the second connection, the voice mail service SSS sends a switching message to whichever switching system the terminal device E-A of the mailbox holder is connected to. The switching system HVS will hereinafter be called the home switching system HVS of the mailbox holder. For the sake of unequivocally identifying the execution sequence ("voice mail user session"), the switching message, also called a Voice_Mail_User_Session_Start report, includes the current telephone number of the terminal device E-A of the mailbox holder and the telephone number of the voice mail service SSS. Additionally, a session-specific time monitoring is started in the voice mail service SSS, for monitoring the logical second connection (30–60 minutes in duration, for example) in step 30. The home switching system HVS of the mailbox holder stores the information contained in the switching message in memory together with the identifier "Voice Mail User Session", and thereupon sends a Voice_Mail_User_Session_Start_Ack report back to the voice mail service SSS.

In step 40, the mailbox holder can thereupon begin the execution, that is, the process of outputting the spoken messages stored in the voice mail service SSS. In the course of the outputting process, step 50, the making of a connection from the terminal device E-A of the mailbox holder to the terminal device E-B of the subscriber (callback) can be requested. If such a request leads to a successful connection between the terminal device E-A of the mailbox holder and the terminal device E-B of the subscriber (call processing callback with automatic transferal), then in a first step, in addition to the connection between the terminal device E-A of the mailbox holder and the voice mail service SSS, a connection is made between the voice mail service SSS and the terminal device E-B of the subscriber. In a second step, the two existing connections are interconnected, creating in a connection between the terminal device E-A of the mailbox holder and the terminal device E-B of the subscriber in which the voice mail service SSS is completely uninvolved.

If the connection between the terminal device E-A of the mailbox holder and the terminal device E-B of the subscriber is terminated on the initiative of the mailbox holder (step 60), for instance by his placing the handset on the cradle (hanging up), then the voice mail user session and thus both the first and second connections are terminated (step 70). If the connection between the terminal devices E-A and E-B is terminated by the subscriber, without the mailbox holder putting the handset on the cradle, and if the second connection between the home switching system of the terminal device E-A and the voice mail service SSS still exists (step 80), then the home switching system HVS of the mailbox holder tries to make a new first connection between the terminal device E-A and the voice mail service SSS, using the information stored in memory in the home switching system HVS (step 90). If the second connection no longer exists, for instance if the second connection has been disconnected by the session-specific time monitoring because a certain period of time has elapsed, then the voice mail user session is ended (step 70).

When the attempt to re-make the first connection is made, if neither a free connection with the voice mail service SSS nor the voice mail service SSS itself is available (step 100), then the mailbox holder is informed of this by some notification, such as a spoken message. He can either wait until a connection line is available (step 110), or he can terminate the still-existing connection and thus end the voice mail user session. If when the attempt is made to re-make the first connection a free connection with the voice mail service and the voice mail service SSS are both available, then a first connection is again made between the terminal device E-A of the mailbox holder and the voice mail service SSS. The mailbox holder can then continue his voice mail user session at the same place where he had been interrupted, at his own instigation, by making the connection with the terminal device E-B of the subscriber. Thus the mailbox holder can continue without being interrupted or taking any further action; that is, he need not enter his identification using the necessary security codes (code number, password) again.

In the event that after the first connection with his voice mail service SSS has been made the mailbox holder has ended the connection himself, for instance by putting the handset on the cradle, then the termination of the voice mail user session is effected on the initiative of the home switching system HVS of the mailbox holder. In this situation, the home switching system HVS of the mailbox holder sends a Voice_Mail_User_Session_End report, with the address of the terminal device E-A, to the address of the voice mail service SSS, which had previously sent the voice mail user session start report to the home switching system HVS of the mailbox holder. The home switching system HVS also deletes all the internal information about the voice mail user session that has existed until now (such as the address of the terminal device E-A of the mailbox holder and the address of the voice mail service SSS). The voice mail service SSS, on receiving this Voice_Mail_User_Session_End report, also terminates the existing second connection and erases the session-specific time monitoring. Optionally, the voice mail service SSS can also forward a Voice_Mail_User_Session_End_Ack report to the home switching system HVS of the mailbox holder.

When the session-specific time monitoring elapses in the voice mail service SSS before a Voice_Mail_User_Session_End report is received, the logical second connection is terminated in the voice mail service SSS. This is indicated to the home switching system HVS of the mailbox holder by a Voice_Mail_User_Session_End report forwarded from the voice mail service SSS. After the connection between the terminal devices E-A and E-B has been terminated by, the subscriber, the voice mail user session is also ended, and the mailbox holder, to further process his messages, must make a new connection with the voice mail service SSS, which requires his inputting all the requisite identification data.

In order not to have to set an extremely long time interval of the session-specific time monitoring in the voice mail service SSS, however, yet still allow fairly long conversations on the part of users of the voice mail service SSS, the home switching system HVS of the mailbox holder can send continuance reports ("Voice_Mail_User_Session_Alive") to the voice mail service SSS at certain intervals (such as every ten minutes). These reports then cause the session-specific time monitoring in the voice mail service SSS to be re-started, so that after even long conversations, it is possible to resume listening to further messages without interruption.

The reports are transmitted between the voice mail service SSS and the home switching system HVS in the context of an ISDN temporary signaling connection, or in other words without using a data channel (B-channel). In this process a switching message, such as Voice_Mail_User_Session_Start, is transmitted with two parameters. The parameters include the address of the terminal device E-A of the mailbox holder and the address of the voice mail service SSS. An acknowledgement of the messages received can optionally be provided.

When non-digital connections of the voice mail service SSS to the switching system HVS are used, or in analog networks, reports are transmitted between the voice mail service SSS and the switching system HVS by sequences of MFV tones, using predefined frequencies for the digits from 0 to 9 and for the * and # signs.

I claim:

1. A method for output handling of messages stored in mailboxes of a message storage system of a telecommunications system, which comprises:

setting up a first connection between a terminal device of a mailbox holder and the message storage system;

setting up a second connection between the telecommunications system associated with the terminal device of the mailbox holder and the message storage system, a telephone number of the terminal device of the mailbox holder and a telephone number of the message storage system being stored in a memory of the telecommunications system;

setting up a third connection between the terminal device of the mailbox holder and a terminal device of a subscriber if a message has been left for the mailbox holder by the subscriber where the third connection replaces the first connection; and setting up a new first connection between the terminal device of the mailbox holder and the message storage system using the telephone number of the terminal device of the mailbox holder and the telephone number of the message storage system stored in the telecommunications system upon a termination, instigated by the subscriber, of the third connection between the terminal device of the mailbox holder and the terminal device of the subscriber.

2. The method according to claim 1, which comprises starting a time monitor when the second connection is made, and that when a predetermined period of time elapses, the second connection is released.

3. The method according to claim 2, which comprises restarting the time monitor by the message storage system after a continuance report transmitted from the telecommunications system has been received.

4. The method according to claim 1, which comprises continuing handling the messages stored in the message storage system at a place where the first connection was replaced when the new first connection is made between the terminal device of the mailbox holder and the message storage system.

5. The method according to claim 1, which comprises reporting to the mailbox holder if it is detected that no free connection is available during a course of making the new first connection between the terminal device of the mailbox holder and the message storage system.

6. The method according to claim 1, which comprises storing at least one of voice mail messages, fax messages, e-mail messages, and audiovisual messages in a memory of the message storage system.

7. The method according to claim 1, wherein one of the first connection and the third connection is an audiovisual connection.

* * * * *